United States Patent Office 2,841,535
Patented July 1, 1958

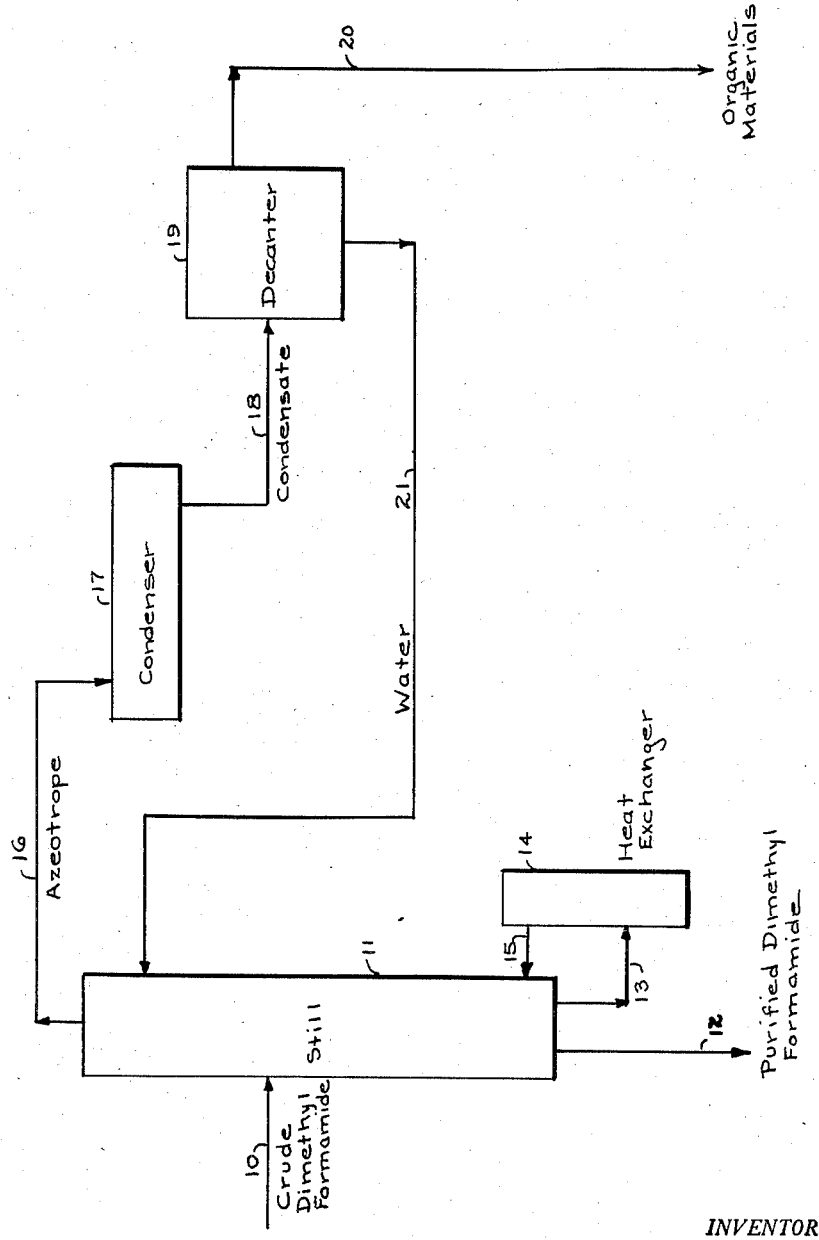

2,841,535
PURIFICATION OF DIMETHYL FORMAMIDE

Everett H. Pryde, Kenmore, N. Y., assignor to E. I. du Pont de Nemours and Company, Wilmington, Del., a corporation of Delaware Application August 22, 1955, Serial No. 529,657

5 Claims. (Cl. 202—42)

This invention relates to the removal of organic impurities from dimethyl formamide. It relates, more particularly, to the removal of organic impurities from dimethyl formamide utilized as a solvent in the cyanidation of 1,4-dichlorobutane to adiponitrile.

U. S. Patent 2,715,137, issued August 9, 1955, discloses a process for cyaniding 1,4-dichlorobutane to adiponitrile in solvent dimethyl formamide by reacting with a metal cyanide. The adiponitrile is separated from the solvent by fractional distillation and, in the preferred continuous operation, the latter is recycled through the cyanidation system. After the solvent has been recycled a number of times the yield of the cyanidation reaction decreases. Ordinary distillation or rectification of the solvent to remove expected impurities such as water, residual adiponitrile and delta-chloro-valeronitrile does not remedy this situation. Prior to the present invention, the original high yield of the process could be restored only by replacing the used solvent with fresh material.

A general object of the present invention is, consequently, to effect improvements in the continuous cyanidation of 1,4-dichlorobutane.

Another object is to provide a process for restoring the initial yield in a process for cyaniding 1,4-dichlorobutane which uses recycled dimethyl formamide as the reaction solvent.

I have discovered that the lowering of yield in the cyanidation reaction is due to the gradual accumulation in the dimethyl formamide of two isomeric five-carbon nitriles having boiling points so close to that of dimethyl formamide that separation by distillation or rectification is practically impossible. I have further discovered that these deleterious nitriles can readily be removed from the solvent by azeotropic distillation with water. Accordingly, the above-mentioned and still further objects are achieved in accordance with this invention by a process in which water is added to the mixture of dimethyl formamide and organic impurities and the latter are azeotropically distilled from the mixture.

The invention may be carried out in either of two modes, i. e., either batch-wise or continuously. For batch-wise operation it is merely necessary to add sufficient water to the solvent to form the azeotrope and distill the mixture. The quantity of water sufficient to provide easy separation of the organic impurities is at least about equal to that of the impurities. Consequently, 25% is necessary where the impurities constitute 25% by weight of the mixture. Continuous operation requires the same quantity of water but is more complicated and more easily understood by reference to the drawing.

The figure shows a still 11 into which is fed through line 10, positioned somewhat above the center of the still, a crude mixture of dimethyl formamide and various impurities resulting from the aforementioned cyanidation. Generally the incoming stream will consist essentially of dimethyl formamide containing water, adiponitrile and isomeric five-carbon nitriles. The mixture is, of course, obtained by first decanting the aqueous solution from the cyanidation product shown in Patent No. 2,715,137 and then removing product adiponitrile by fractional distillation.

Still 11 is preferably operated under reduced pressure, 200–300 mm. of mercury being satisfactory, and a temperature gradient. Preferred temperatures are about 120–125° C. at the bottom of the still, about 80–90° C. around the center, i. e., at the inlet of line 10, and about 60–70° C. at the top. Purified dimethyl formamide is removed through line 12 at the bottom of still 11. Temperature is easily maintained in the still by heat exchanger 14 connected thereto through lines 13 and 15.

A gaseous azeotrope consisting of the organic impurities formed during cyanidation and water is withdrawn from the still through line 16 to condenser 17. The azeotrope is converted to a liquid in condenser 17 and passed through line 18 to decanter 19. In the decanter the azeotrope rapidly divides into an upper organic layer and a lower water layer. The upper layer, which contains dichlorobutane and the five-carbon nitriles together with some water, is continuously removed through line 20 for further treatment as desired.

The lower layer from decanter 19, consisting almost entirely of water, is fed through line 21 back into the top of still 11. The rate of flow is adjusted so that the water fed back weighs between one-fourth and one-third as much as the dimethyl formamide admitted to the still. In this manner the azeotrope is continuously formed and substantially all the unwanted organic impurities are removed from the dimethyl formamide.

It will be apparent to those skilled in the art that various modifications in the conditions described are possible. Thus the pressure in the still may be varied between about 200 and 500 mm. of mercury, temperature being adjusted accordingly. Atmospheric pressure can be used although it is not particularly desirable, requiring an inconveniently high temperature. Pressures lower than 200 mm. also can be used but are too difficult to maintain.

The rate of flow of water may also be varied to some extent. For best results, however, the weight of water recycled should be one-fourth to one-third that of the dimethyl formamide fed.

It will be understood that the distillation can be carried out in two or more steps, the exact number depending on the efficiency of the still utilized.

The invention will be understood in more detail from the examples which follow. In these examples all parts and percentages are by weight.

Example 1

This example shows an azeotropic distillation of a batch of dimethyl formamide at atmospheric pressure.

To 1342 g. of impure dimethyl formamide was added 336 g. (25%) of water. The dimethyl formamide contained around 21% of the isomeric five-carbon nitriles. Attempts to separate these compounds by simple distillation procedures had previously failed.

The water-organic mixture was placed in a flask connected with distillation column and distilled for 2 hours at 95°–107° C. at atmospheric pressure. The distillate was caught in a decanter where it separated into an upper organic and a lower water layer. The water layer was continuously recycled to the flask during this two hour period.

Distillation was then continued for 2½ additional hours with no recycle of the water, the distillation temperature rising from 107° C. to 130° C. The residue was found to be almost pure dimethyl formamide comprising about 77% of the original impure organic material.

*Example 2*

This example shows steam-distillation of a batch of dimethyl formamide under reduced pressure.

A batch of impure dimethyl formamide was mixed with water in the proportion of 1:1 and steam-distilled under a pressure of 9.5 inches of mercury (240 mm.) at 67°–73° C. for 4 hours. The dimethyl formamide initially contained chlorovaleronitrile, and isomeric five-carbon nitriles. At the end of the 4 hour period the dimethyl formamide did not contain a detectable amount of impurities and comprised 74.3% of the original material.

*Example 3*

This example illustrates the build-up of organic impurities in dimethyl formamide during continuous operation and is included as a control.

A cyanidation process as shown in U. S. Patent No. 2,715,137 was continuously carried out for several months. Product adiponitrile was substantially separated from the dimethyl formamide solvent and the latter was continuously recirculated through the cyanidation system.

The initial conversion of 1,4-dichlorobutane was around 92–95% based on the total amount of 1,4-dichlorobutane added. At the end of the cyanidation period, conversions had erratically fallen to around 75–80%. Analysis of the solvent showed that it comprised about 25% by weight of isomeric five-carbon nitriles.

*Example 4*

This example illustrates the continuous mode of operating the present invention.

Into the apparatus illustrated in the figure and under the conditions given therefor was continuously fed 5–9 parts per hour of dimethyl formamide previously utilized as the solvent in the cyanidation noted above. The dimethyl formamide contained cyanidation impurities comprising water, 1,4-dichlorobutane, adiponitrile, delta-chlorovaleronitrile and isomeric five-carbon nitriles. During the distillation, water was continuously fed back from the decanter at a rate of 1.7–3.2 parts per hour.

During an operating period of several months the impurities in the dimethyl formamide withdrawn from the bottom of the still were found not to increase. The excess of organic materials from the solvent were removed from the decanter and separated as desired. The conversion of 1,4-dichlorobutane to adiponitrile in the cyanidation reaction utilizing the purified dimethyl formamide remained constant at about 92–95%.

Having described my invention, I claim:

1. In a process for the preparation of adiponitrile by reacting a metal cyanide with 1,4-dichlorobutane using as a solvent dimethyl formamide recovered from a similar previous preparation following separation of adiponitrile by fractional distillation, the improvement comprising removal of five-carbon nitriles from the dimethyl formamide solvent by adding water thereto and azeotropically distilling water and said nitriles from the resultant mixture.

2. The method of claim 1 in which the water is about one-fourth to one-third that of the dimethyl formamide from which the 5-carbon nitriles are to be azeotropically distilled.

3. The method of claim 2 in which the azeotropic distillation is carried out at a pressure of 200–500 mm. of mercury.

4. In a process for the continuous production of adiponitrile by the cyanidation of 1,4-dichlorobutane using dimethyl formamide as solvent and recycling the same following removal of adiponitrile by fractional distillation, the step of continuously removing five-carbon nitriles from said solvent before reuse, said step comprising continuously feeding the solvent to be recycled together with a weight of water equal to about one-fourth to about one-third that of said solvent into a distillation column maintained at a pressure of about 200–300 mm. of mercury and at a maximum temperature of 120–125° C., continuously withdrawing dimethyl formamide free of five carbon nitriles from the bottom of the still and continuously withdrawing the azeotrope of water and five-carbon nitriles from the top of the still.

5. The process of claim 4 in which the weight of water fed to the distillation column is about equal to the five-carbon nitriles in the dimethyl formamide solvent to be recycled.

References Cited in the file of this patent

UNITED STATES PATENTS

| | | |
|---|---|---|
| 2,415,662 | Teter et al. | Feb. 11, 1947 |
| 2,715,137 | Copelin | Aug. 9, 1955 |